United States Patent [19]

Walter

[11] 4,140,637
[45] Feb. 20, 1979

[54] PERMEABILITY SEPARATORY METHOD AND APPARATUS

[76] Inventor: Carl W. Walter, 91 Highland St., Holliston, Mass. 01746

[21] Appl. No.: 839,932

[22] Filed: Oct. 6, 1977

[51] Int. Cl.² ............................................. B01D 13/04
[52] U.S. Cl. ................................................ 210/321 R
[58] Field of Search ............ 210/22 R, 321 R, 321 A, 210/321 B, 497.1, 499, 500 M

[56] References Cited

U.S. PATENT DOCUMENTS

| | | | |
|---|---|---|---|
| 3,536,611 | 10/1970 | Filippi et al. | 210/321 B |
| 4,001,110 | 1/1977 | Geen et al. | 210/22 A |
| 4,031,012 | 6/1977 | Gics | 210/321 B |

Primary Examiner—William A. Cuchlinski, Jr.
Attorney, Agent, or Firm—John E. Toupal

[57] ABSTRACT

A permeability separatory device including a shell element that retains a woven mat wound into a roll and composed of a woof portion formed by a plurality of substantially parallel hollow membrane fibers having open inlet and outlet ends so as to provide parallel fluid flow paths and a plurality of warp portions formed by strands of yarn woven transversely to the hollow fibers so as to establish predetermined interstitial spacing therebetween. The open ends of the hollow fibers are sealed from a fluid circulation zone defined by the shell and retaining the wound roll. Also defined by the shell element are inlet and outlet openings for circulating a dialysate fluid through the circulation zone and over the surfaces of the hollow fibers. The warp portions of the woven mat include one warp portion for establishing at one end of the wound roll a given restriction to fluid flow axially therethrough and another warp portion for establishing at an opposite end thereof a greater restriction to fluid flow. An additional warp portion is formed by yarn woven obliquely to the hollow fibers and extends between opposite ends of the wound roll.

15 Claims, 4 Drawing Figures

PERMEABILITY SEPARATORY METHOD AND APPARATUS

BACKGROUND OF THE INVENTION

This invention relates generally to a permeable membrane method and apparatus for the separation of liquids and, more particularly, to such a method and apparatus for purifying blood in the absence of a functional kidney for that purpose.

Permeable membrane elements are used in a wide variety of devices in which the different components of multi-component fluids are to be resolved. Many types of permeable membranes have been developed including osmotic membranes, ion exchange membranes, those that possess selective permeation rates for two or more non-ionic components of fluid mixtures and, of particular interest in this invention, the so-called molecular sieve type membranes that accommodate dialysis in devices such as artificial kidneys. Although they function effectively to separate fluids, membrane devices exhibit an inherent disadvantage of accommodating only slow rates of diffusion. For this reason developers in the field have sought membrane geometries that yield high membrane surface-to-volume ratios.

One known high membrane surface-to-volume ratio device utilizes a bundle of hollow capilary fibers within a shell. A feed mixture is introduced into the open ended fibers at one end of the bundle, a permeate-lean fraction is removed from the open ended fibers at the opposite end of the bundle, and a permeate-rich fraction is removed with a sweep stream that flows between the shell and the fibers. Separatory devices of this type are disclosed, for example, in U.S. Pat. Nos. 3,019,853; 3,228,877; 3,536,611 and 3,708,071. Although exhibiting high membrane surface-to-volume ratios, the fiber bundle separatory devices generally exhibit the disadvantage of causing non-uniform flow and channeling of the sweep stream and a poor fluid flow distribution pattern that results in a reduction in separatory efficiency. The poor fluid flow patterns result primarily from capilary action that draws the individual fibers of the bundle closely together thereby inhibiting flow and preventing uniform wetting thereof.

The object of this invention, therefore, is to provide a hollow fiber bundle type separatory device that exhibits improved fluid flow characteristics and more uniform wetting of the available membrane surface.

SUMMARY OF THE INVENTION

The invention is a permeability separatory device including a shell element that retains a woven mat wound into a roll and composed of a woof portion formed by a plurality of substantially parallel hollow membrane fibers having open inlet and outlet ends so as to provide parallel fluid flow paths and a plurality of warp portions formed by strands of yarn woven transversely to the hollow fibers so as to establish predetermined interstitial spacing therebetween. The open ends of the hollow fibers are sealed from a fluid circulation zone defined by the shell and retaining the wound roll. Also defined by the shell element are inlet and outlet openings for circulating a dialysate fluid through the circulation zone and over the surfaces of the hollow fibers. The warp portions of the woven mat include one warp portion for establishing at one end of the wound roll a given restriction to fluid flow axially therethrough and another warp portion for establishing at an opposite end thereof a greater restriction to fluid flow. By establishing predetermined different restrictions to fluid flow at opposite ends of the wound roll, the dialysate pressure within the fluid circulation zone is controlled to provide an optimum filtration rate.

According to an additional feature of the invention, the woven mat has an additional warp portion formed by yarn woven obliquely to the hollow fibers and extending between opposite ends of the wound roll. The obliquely woven yarn introduces shear flow of the dialysate and thereby produces desirable redistribution thereof within the fluid circulation zone.

The invention encompasses further a unique method for producing the wound roll utilized in the above-described separatory device. The method entails weaving a mat having a warp constituent formed by a continuous hollow membrane fiber arranged with a plurality of substantially parallel sections and a woof constituent formed by yarn woven transversely to the parallel sections. During the weaving process, the lay of the continuous membrane fiber reverses directions at reversal points along opposite peripheries of the mat to establish the parallel sections. Upon completion of the weaving process, the membrane fiber is cut at the reversal points so as to provide the required open ends for the parallel sections. The use of a continuous unbroken hollow fiber preserves chemical purity within the fiber during the weaving process.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENT

Figure 1:
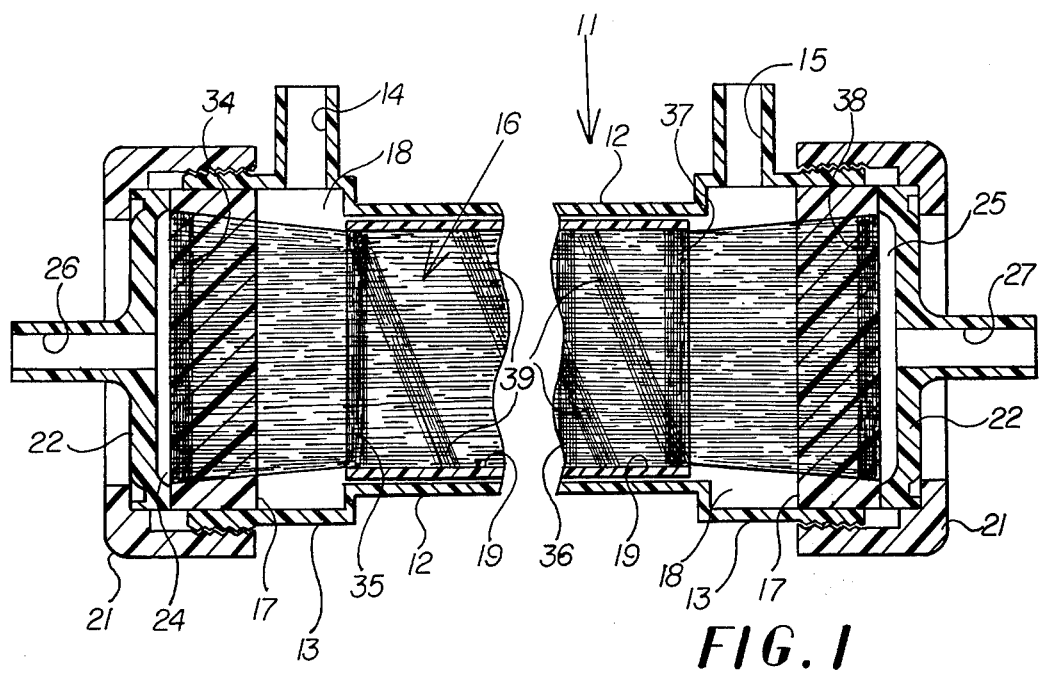
FIG. 1 is a schematic cross-sectional view of a membrane fiber separatory device according to the invention.

Referring now to FIG. 1 there is shown a membrane separatory device 11 specifically suited for use as an artificial kidney. An elongated shell 12 has enlarged end portions 13 that define, respectively, a fluid inlet opening 14 and a fluid outlet opening 15. Retained by the shell 12 and extending from end to end thereof is a bundle 16 of open ended hollow capilary fibers. Described hereinafter is a preferred method for fabricating the bundle 16. Molded around the ends of the bundle 16 are headers 17 that provide fluid seals between the open ends of the capilary fibers and a fluid circulation zone 18 within the shell 12. A cylindrical spacer 19 is positioned between the bundle 16 and the inner surface of the shell 12. Threadedly engaged to each of the shell end portions 13 is an annular cap 21 that retains an end piece 22. The end pieces 22 have inwardly directed peripheral ridges 23 that are forced by the caps 21 into sealing engagement with the headers 17. Defined between the headers 17 and the end pieces 23, respectively, are an inlet cavity 24 and an outlet cavity 25. Axially aligned with a central aperture in one of the end pieces 22 is an inlet tube 26 that is in fluid communication with the inlet cavity 24. Similarly, an outlet tube 27 is axially aligned with a central aperture in the other end piece 22 and is in fluid communication with the outlet cavity 25. The cavities 24 and 25 encompass the open ends of the capilary fibers forming the bundle 16 and are fluid tightly sealed from the circulation zone 18 in the shell 12 by the headers 17.

The device 11 functions as a permeability separator in the manner described in the above-noted U.S. patents. A feed fluid enters the inlet 26, passes through the inlet cavity 24, the hollow capilary fibers 16 and the outlet cavity 25 and exits through the outlet tube 27. Simultaneously, a suitable sweep stream enters the inlet tube 14, passes over the outer surfaces of the fiber bundle 16 in the fluid circulation zone 18 and out of the outlet tube 15. During this fluid flow a fraction of the feed fluid to be separated permeates through the walls of the hollow fibers. Consequently, the feed fluid passing out of the outlet 27 is permeate-lean while the sweep fluid passing out of the outlet 15 is permeate enriched. It will be understood, of course, that the described direction of flow could be reversed or that the flow of the feed and sweep streams can be countercurrent as well as concurrent. In a preferred use of the device 11 as an artificial kidney, blood is circulated through the hollow fibers 16 and a dialysate fluid is circulated through the fluid circulation zone 18 to produce blood purifying osmosis through the walls of the fibers.

Figure 2:
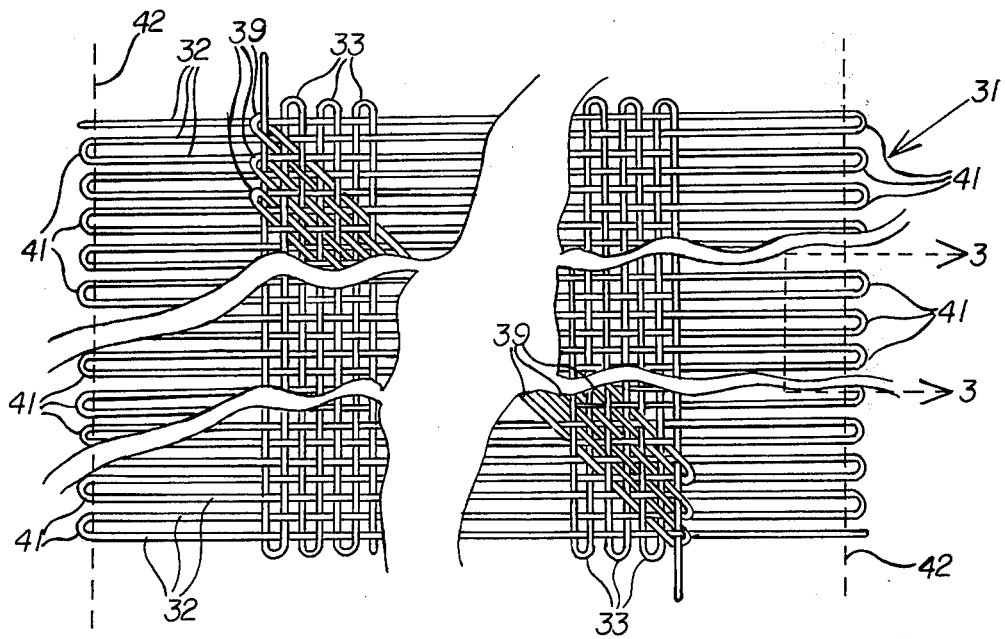
FIG. 2 is a schematic, partially cut-away plan view of a woven mat for forming a fiber bundle used in the device of FIG. 1.
Figure 3:
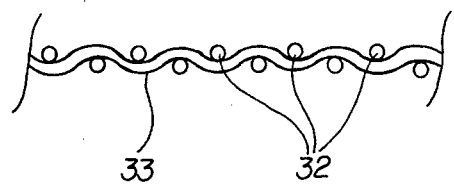
FIG. 3 is a cross-sectional view taken along lines 3—3 of FIG. 2.

Referring now to FIG. 2 there is schematically illustrated a woven mat 31 that is used to fabricate the bundle 16 shown in FIG. 1. The woof constituent of the woven mat 31 is formed by parallel sections 32 of hollow capilary fibers while the warp constituent is formed by transversely oriented strands of yarn 33. The yarn 33 does not extend over the entire length of the fibers 32 but rather is discontinuous so as to form a plurality of spaced apart warp portions. Thus, as shown in FIG. 1, the fiber bundle 16 comprises a plurality of spaced apart warp portions 34-38 each formed by transversely woven sections of yarn 33. Another warp portion extends between diagonally opposite corners of the mat 31 and is formed by yarn strands 39 woven obliquely to the hollow fibers 32.

According to a preferred method of this invention, the mat 31 is initially woven with a continuous, unbroken length of a hollow capilary fiber as illustrated in FIG. 2. During the weaving process the lay of the continuous hollow fiber reverses at reversal points 41 located along opposite peripheries of the mat 31 so as to provide the parallel hollow fiber sections 32. After completion of the weaving process opposite edges of the mat 31 are severed adjacent to the reversal points 41 (as indicated by dashed lines 42) so as to provide the fiber sections 32 with the open ends required to establish parallel flow paths. The use of a continuous unbroken hollow fiber simplifies the weaving process and even more significantly preserves chemical purity within the individual fiber sections 32 during that stage of fabrication.

Figure 4:
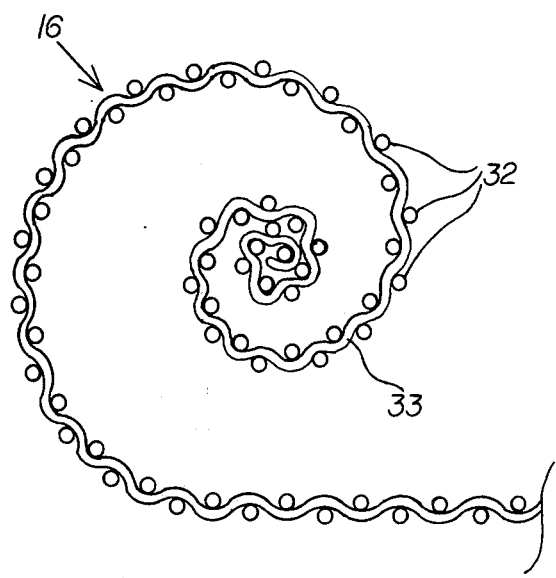
FIG. 4 is a schematic cross-sectional view illustrating the formation of a fiber roll with the woven mat of FIG. 2.

After completion of the weaving process the mat 31 is wound, as shown in FIG. 4, into a cylindrical roll having an axis parallel to the fiber sections 32. The roll or bundle 16 is then inserted into the shell 12 and the headers 17 applied to seal the open ends of the fiber sections 32 from the fluid circulation zone 18. After assembly of the caps 21 and end pieces 22, the device 11 is used in the manner described above. During such use the yarn forming the warp portions 34-38 maintains uniform interstitial spacing between the parallel fiber strands 32. This prevents excessive congestion of the fiber sections 32 and insures a uniform flow of dialysate axially through the bundle 16. Consequently, a uniform wetting of the fiber strands 32 is achieved resulting in maximum permeation efficiency. In addition, the warp portions 34 and 38 adjacent to the ends of the bundle 16 function to uniformly space the ends of the fibers 32 during molding of the headers 17. Also enhancing flow distribution of the dialysate and uniform wetting of the fiber strands 32 is the warp portion formed by the oblique yarn strands 39 shown in FIG. 2. The oblique strands 39 which extend spirally from end to end of the fiber bundle 16 introduce shear flow of the dialysate and thereby causes redistribution thereof.

Another important feature of the invention is the utilization of the spaced apart warp portions 34-38 to establish desired fluid pressures within the circulation zone 18. For example, by employing smaller gauged yarn for the warp portion 37 than for the warp portion 35 a greater restriction to fluid flow is provided adjacent to the outlet 15 than to the inlet 14. This will compensate for the pressure drop that would normally accompany flow of the dialysate fluid between the inlet 14 and the outlet 15. By suitably selecting different gauged warp yarns in this manner, a substantially uniform dialysate pressure can be achieved throughout the circulation zone 18 resulting in an optimum filtration rate through the walls of the fibers 32.

As a specific example, the device 11 comprises polystyrene caps 21 and end pieces 23 and a polystyrene shell 12 having a length of 275 millimeters and a diameter of 77 millimeters. The headers 17 are composed of polyethylene and a polyurethene elastomer potting material. Forming the bundle 16 are 8000 fiber sections 32 made of PMMA and having a 240 micron inner diameter of 50 micron wall thickness. As noted above, the gauge of the warp yarn 33 varies depending upon the pressure desired in the circulation zone 18. It will be understood that other materials could be used for the different components and examples of suitable alternatives are disclosed in the above-noted U.S. patents.

Obviously, many modifications and variations of the present invention are possible in light of the above teachings. It is to be understood, therefore, that the invention can be practiced otherwise than as specifically described.

What is claimed is:

1. Permeability separatory apparatus comprising:
   a woven mat wound into a roll, said mat comprising a woof portion formed by a plurality of substantially parallel hollow membrane fibers having open inlet and outlet ends and providing parallel fluid flow paths and a plurality of warp portions formed by strands of yarn woven transversely to said hollow fibers so as to establish predetermined interstical spacing between said hollow fibers, said warp portions comprising one warp portion for establishing at one end of said roll a given restriction to fluid flow axially therethrough and another warp portion for establishing at an opposite end of said roll a greater restriction to fluid flow axially therethrough;
   a shell retaining said roll and defining therewith a fluid circulation zone;

seal means providing fluid seals between said circulation zone and both said open inlet and outlet ends of said fibers;

inlet means for introducing a fluid stream into said circulation zone at said one end of said roll; and outlet means for removing fluid from said circulation zone at said opposite end of said roll.

2. An apparatus according to claim 1 including means forming an inlet cavity at one end of said shell and an outlet cavity at an opposite end thereof, said inlet cavity being in fluid communication with said open inlet ends of said fibers and said outlet cavity being in fluid communication with said open outlet ends thereof.

3. An apparatus according to claim 2 wherein said shell is an elongated shell element, said seal means comprise headers molded around opposite ends of said roll, and said means defining said inlet and outlet cavities comprise caps attached to opposite ends of said elongated shell element.

4. An apparatus according to claim 3 wherein said inlet and outlet means comprise a pair of tubes, one opening into each end of said elongated shell element between said molded headers.

5. An apparatus according to claim 1 including an additional warp portion formed by strands of yarn woven obliquely to said hollow fibers.

6. An apparatus according to claim 5 including means forming an inlet cavity at one end of said shell and an outlet cavity at an opposite end thereof, said inlet cavity being in fluid communication with said open inlet ends of said fibers and said outlet cavity being in fluid communication with said open outlet ends thereof.

7. An apparatus according to claim 6 wherein said shell is an elongated shell element, said seal means comprise headers molded around opposite ends of said roll, and said means defining said inlet and outlet cavities comprise caps attached to opposite ends of said elongated shell element.

8. An apparatus according to claim 7 wherein said inlet and outlet means comprise a pair of tubes, one opening into each end of said elongated shell element between said molded headers.

9. An apparatus according to claim 8 wherein the yarn in said one warp portion is of different size than the yarn in said another warp portion so as to establish said greater restriction to fluid flow.

10. Permeability separatory apparatus comprising:

a woven mat wound into a roll, said mat comprising a woof portion formed by a plurality of substantially parallel hollow membrane fibers having open inlet and outlet ends and providing parallel fluid flow paths and a plurality of warp portions formed by strands of yarn woven both transversely and obliquely to said hollow fibers so as to establish predetermined intersticial spacing between said hollow fibers;

a shell retaining said roll and defining therewith a fluid circulation zone;

seal means providing fluid seals between said circulation zone and both said open inlet and outlet ends of said fibers;

inlet means for introducing a fluid stream into said circulation zone at said one end of said roll; and outlet means for removing fluid from said circulation zone at said opposite end of said roll.

11. An apparatus according to claim 10 including means forming an inlet cavity at one end of said shell and an outlet cavity at an opposite end thereof, said inlet cavity being in fluid communication with said open inlet ends of said fibers and said outlet cavity being in fluid communication with said open outlet ends thereof.

12. An apparatus according to claim 11 wherein said shell is an elongated shell element, said seal means comprise headers molded around opposite ends of said roll, and said means defining said inlet and outlet cavities comprise caps attached to opposite ends of said elongated shell element.

13. An apparatus according to claim 12 wherein said inlet and outlet means comprise a pair of tubes, one opening into each end of said elongated shell element between said molded headers.

14. A method for forming permeability separatory apparatus comprising the steps of:

weaving a mat having a woof constituent formed by a continuous hollow membrane fiber arranged with a plurality of substantially parallel sections and a warp constituent formed by yarn woven transversely to said parallel sections; the lay of said continuous membrane fiber reversing directions at reversal points along opposite peripheries of said mat to establish said parallel sections; said weaving step comprising weaving adjacent to said reversal points at one end of said mat one warp portion for establishing a given restriction to fluid flow axially through said roll, and weaving adjacent to said reversal points at the opposite end of said mat another warp portion for establishing a greater restriction to said fluid flow;

cutting said membrane fiber at said reversal points so as to open the ends of said parallel sections;

winding said mat into a roll having an axis parallel to said parallel sections;

inserting said roll into a shell element that defines fluid inlet and outlet openings separated by a fluid circulation zone; and sealing said open ends of said sections from said fluid circulation zone.

15. A method according to claim 14 wherein said weaving step comprises weaving said one warp portion with a different sized yarn than said another warp portion.

* * * * *